United States Patent
Petersson et al.

(10) Patent No.: US 10,333,633 B2
(45) Date of Patent: Jun. 25, 2019

(54) ANGLE OF ARRIVAL ESTIMATION IN A RADIO COMMUNICATIONS NETWORK

(71) Applicant: Telefonaktiebolaget LM Ericsson (publ), Stockholm (SE)

(72) Inventors: Sven Petersson, Sävedalen (SE); Fredrik Athley, Kullavik (SE); Andreas Nilsson, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 63 days.

(21) Appl. No.: 15/531,650

(22) PCT Filed: May 10, 2017

(86) PCT No.: PCT/EP2017/061163
§ 371 (c)(1),
(2) Date: May 30, 2017

(87) PCT Pub. No.: WO2018/206098
PCT Pub. Date: Nov. 15, 2018

(65) Prior Publication Data
US 2018/0337739 A1  Nov. 22, 2018

(51) Int. Cl.
*G01S 3/04* (2006.01)
*G01S 3/16* (2006.01)
(Continued)

(52) U.S. Cl.
CPC .............. *H04B 17/27* (2015.01); *G01S 3/48* (2013.01); *H01Q 3/267* (2013.01); *H04B 7/0617* (2013.01); *H04B 7/086* (2013.01); *H04B 7/0848* (2013.01); *H04L 5/0023* (2013.01); *H04L 5/0053* (2013.01); *H04W 72/048* (2013.01);
(Continued)

(58) Field of Classification Search
CPC ...... H04B 17/27; H01Q 3/267; H04L 5/0023; H04L 5/0053; H04W 72/048; H04W 72/0446
See application file for complete search history.

(56) References Cited

U.S. PATENT DOCUMENTS

2010/0123616 A1  5/2010  Minami
2016/0308279 A1  10/2016  Athley et al.

FOREIGN PATENT DOCUMENTS

WO  2015038235 A1  3/2015

OTHER PUBLICATIONS

International Search Report and Written Opinion issued in International Application No. PCT/EP2017/061163, dated Jan. 19, 2018, 16 pages.

(Continued)

*Primary Examiner* — Eric Myers
(74) *Attorney, Agent, or Firm* — Rothwell, Figg, Ernst & Manbeck, p.c.

(57) ABSTRACT

There is provided mechanisms for estimating angle of arrival of a radio signal in a radio communications network. A method is performed by a radio transceiver device. The radio transceiver device comprises an antenna array that, by means of analog beamforming, is configured to shift between at least two phase center locations. The method comprises obtaining measurements of the radio signal as received by the antenna array using two mutually different phase center locations. The method comprises estimating the angle of arrival of the radio signal using the measurements as obtained using the two mutually different phase center locations.

20 Claims, 7 Drawing Sheets

(51) Int. Cl.
  *G01S 3/48* (2006.01)
  *H01Q 3/26* (2006.01)
  *H04B 7/06* (2006.01)
  *H04B 7/08* (2006.01)
  *H04L 5/00* (2006.01)
  *H04B 17/27* (2015.01)
  *H04W 72/04* (2009.01)

(52) U.S. Cl.
  CPC . *G01S 3/04* (2013.01); *G01S 3/16* (2013.01); *H04W 72/0446* (2013.01)

(56) References Cited

OTHER PUBLICATIONS

Gang Li, et al., Direction of Arrival Estimation in Time Modulated Linear Arrays With Unidirectional Phase Center Motion, IEEE Transactions on Antennas and Propagation, vol. 58, No. 4, Apr. 2010, 7 pages.

ANGLE OF ARRIVAL ESTIMATION IN A RADIO COMMUNICATIONS NETWORK

CROSS REFERENCE TO RELATED APPLICATION(S)

This application is a 35 U.S.C. § 371 National Stage of International Patent Application No. PCT/EP2017/061163, filed May 10, 2017, designating the United States, the disclosure of which is incorporated by reference.

TECHNICAL FIELD

Embodiments presented herein relate to a method, a radio transceiver device, a computer program, and a computer program product for estimating angle of arrival of a radio signal in a radio communications network.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node at the network side and at the wireless devices at the user side might be required to reach a sufficient link budget.

The wireless devices and/or the transmission and reception point (TRP) of the network node could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different wireless devices, different implementations will be needed.

One purpose of so-called beam management is for the network node to keep track of its served wireless devices with narrow beams (as used at the TRP and/or the wireless devices) in order to increase coverage and throughput. Due to rotation, movement and/or blockage of the served wireless devices the beam (at the TRP and/or wireless devices) needs to be updated dynamically in order to maintain good channel quality between the network node and the served wireless devices. In case an operative connection between a served wireless device and the network node is lost, for example due to blockage, a beam recovery procedure can be initiated to re-establish the beam connection. Such beam recovery procedure could, for example, involve sweeping through all different combinations of beams, both at the TRP and at the wireless device. When there are many candidate beams such beam sweeping procedure could be costly in terms of time consumption and overhead signaling. Beam training might require large overhead signaling and time consumption especially for analog and hybrid antenna array implementations where beams must be swept in a sequential manner. If antenna arrays with analog beamforming are used at both the TRP and the wireless device this becomes even more challenging since, in an exhaustive beam search, for each TRP beam all candidate beams at the wireless device need to be tested.

Hence, there is still a need for improved beam management.

SUMMARY

An object of embodiments herein is to provide efficient angle of arrival estimation that can be used for efficient beam management.

According to a first aspect there is presented a method for estimating angle of arrival of a radio signal in a radio communications network. The method is performed by a radio transceiver device. The radio transceiver device comprises an antenna array that, by means of analog beamforming, is configured to shift between at least two phase center locations. The method comprises obtaining measurements of the radio signal as received by the antenna array using two mutually different phase center locations (i.e. two mutually different phase center locations of the at least two phase center locations). The method comprises estimating the angle of arrival of the radio signal using the measurements as obtained using the two mutually different phase center locations.

According to a second aspect there is presented a radio transceiver device for estimating angle of arrival of a radio signal in a radio communications network. The radio transceiver device comprises an antenna array that, by means of analog beamforming, is configured to shift between at least two phase center locations. The radio transceiver device further comprises processing circuitry. The processing circuitry is configured to cause the radio transceiver device to obtain measurements of the radio signal as received by the antenna array using two mutually different phase center locations (i.e. two mutually different phase center locations of the at least two phase center locations). The processing circuitry is configured to cause the radio transceiver device to estimate the angle of arrival of the radio signal using the measurements as obtained using the two mutually different phase center locations.

According to a third aspect there is presented a radio transceiver device for estimating angle of arrival of a radio signal in a radio communications network. The radio transceiver device comprises an antenna array that, by means of analog beamforming, is configured to shift between at least two phase center locations. The radio transceiver device further comprises processing circuitry and a storage medium. The storage medium stores instructions that, when executed by the processing circuitry, cause the radio transceiver device to perform operations, or steps. The operations, or steps, cause the radio transceiver device to obtain measurements of the radio signal as received by the antenna array using two mutually different phase center locations (i.e. two mutually different phase center locations of the at least two phase center locations). The operations, or steps, cause the radio transceiver device to estimate the angle of arrival of the radio signal using the measurements as obtained using the two mutually different phase center locations.

According to a fourth aspect there is presented a radio transceiver device for estimating angle of arrival of a radio signal in a radio communications network. The radio transceiver device comprises an antenna array that, by means of analog beamforming, is configured to shift between at least two phase center locations. The radio transceiver device further comprises an obtain module configured to obtain measurements of the radio signal as received by the antenna array using two mutually different phase center locations (i.e. two mutually different phase center locations of the at least two phase center locations). The radio transceiver device further comprises an estimate module configured to estimate the angle of arrival of the radio signal using the measurements as obtained using the two mutually different phase center locations.

According to a fifth aspect there is presented a computer program for estimating angle of arrival of a radio signal in a radio communications network, the computer program comprising computer program code which, when run on a radio transceiver device, causes the radio transceiver device to perform a method according to the first aspect. The radio transceiver device comprises an antenna array that, by means of analog beamforming, is configured to shift between at least two phase center locations.

According to a sixth aspect there is presented a computer program product comprising a computer program according to the fifth aspect and a computer readable storage medium on which the computer program is stored. The computer readable storage medium could be a non-transitory computer readable storage medium.

Advantageously this method, these radio transceiver devices, this computer program, and this computer program product provide efficient angle of arrival estimation, in turn enabling efficient beam management.

Advantageously this method, these radio transceiver devices, this computer program, and this computer program product avoids the usage of a sequential beam sweep at the radio transceiver device receiving the radio signal. This reduces the time to find the best analog beam pair and the overhead associated with transmission of beam finding reference signals.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
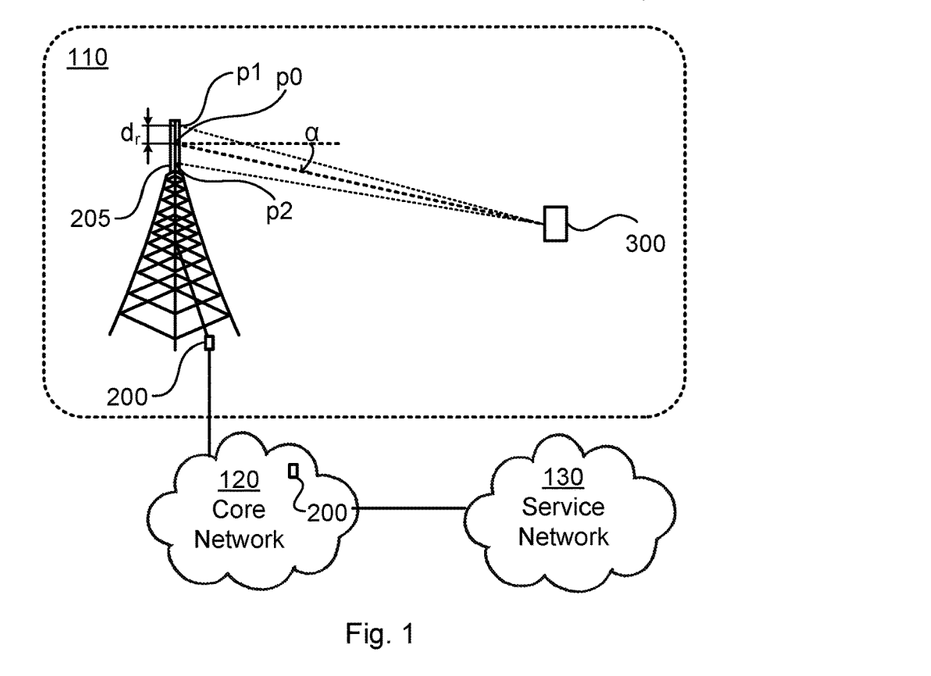
FIG. 1 is a schematic diagram illustrating a communications network according to embodiments.

FIG. 1 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard. The communications network 100 comprises at least one radio transceiver device 200 configured to provide network access to radio transceiver device 300 in a radio access network 110. The radio access network 110 is operatively connected to a core network 120. The core network 120 is in turn operatively connected to a service network 130, such as the Internet. Radio transceiver device 300 is thereby, via the radio transceiver device 200, enabled to access services of, and exchange data with, the service network 130. The network node 200 provides network access in the radio access network 110 by transmitting signals to, and receiving signals from, the radio transceiver device 300. The signals could be transmitted from, and received by, a TRP 205 of the radio transceiver device 200. The TRP 205 could form an integral part of the radio transceiver device 200 or be physically separated from the radio transceiver device 200.

For ease of description, radio transceiver device 200 represents a receiving radio transceiver device and radio transceiver device 300 represents a transmitting radio transceiver device, although, as understood by the skilled person, both radio transceiver devices 200, 300 are generally configured for both transmission and reception. Particularly, the radio transceiver device 200 is, via TRP 205, configured to receive radio signals as transmitted by the radio transceiver device 300.

The herein disclosed embodiments can be applied at a radio transceiver device implemented both as a radio access network node and a wireless device, or even as a radio transceiver device implemented as a backhauling node or a sidelink node. Thus, although the radio transceiver device 200 in at least some of the herein disclosed embodiments is envisioned as being a radio access network node and the radio transceiver device 300 is envisioned as being a wireless device, the functionality of the herein disclosed radio transceiver device 200 could equally be implemented in a wireless device.

Examples of radio access network nodes are radio base stations, base transceiver stations, Node Bs, evolved Node Bs, gigabit Node Bs, access points and access nodes. Examples of wireless devices are mobile stations, mobile phones, handsets, wireless local loop phones, user equipment (UE), smartphones, laptop computers, tablet computers, network equipped sensors, network equipped vehicles, and so-called Internet of Things devices.

The radio signal transmitted by the radio transceiver device 300 is at the radio transceiver device 200 received at an angle of arrival α. Generally, the angle of arrival α is determined relative the node at which the radio signal is physically received over the radio interface. In the illustrative example of FIG. 1 this node is, for radio signals received by the radio transceiver device 200, represented by the TRP 205. The angle of arrival α will generally depend on the location of the phase center of the antenna array used to receive the signals. FIG. 1 schematically illustrates three different phase center locations p0, p1, p2. However, for most practical antenna arrays the change of the location of the phase center will be so small that the angle of arrival will be substantially the same (such as a difference in angle of arrival being in the order of a fraction of a degree or even smaller). Thus, the difference in angel of arrival for the different phase center locations p0, p1 and p2 is in FIG. 1 exaggerated for illustrative purposes. What does change is the electrical phase as a function of the angel of arrival (simply since the path length become different). The relation is $\varphi=2\cdot\pi/d_r\cdot\sin(\alpha)$, where $\varphi$ is the electrical phase, $d_r$ is the change in phase center location (such as between p0 and p1 or between p0 and p2) expressed in wavelengths and α is the angle of arrival (relative a normal to the antenna array of the TRP). It will below be disclosed how to move the phase center from p0 to p1 and from p0 to p2.

Figure 2:
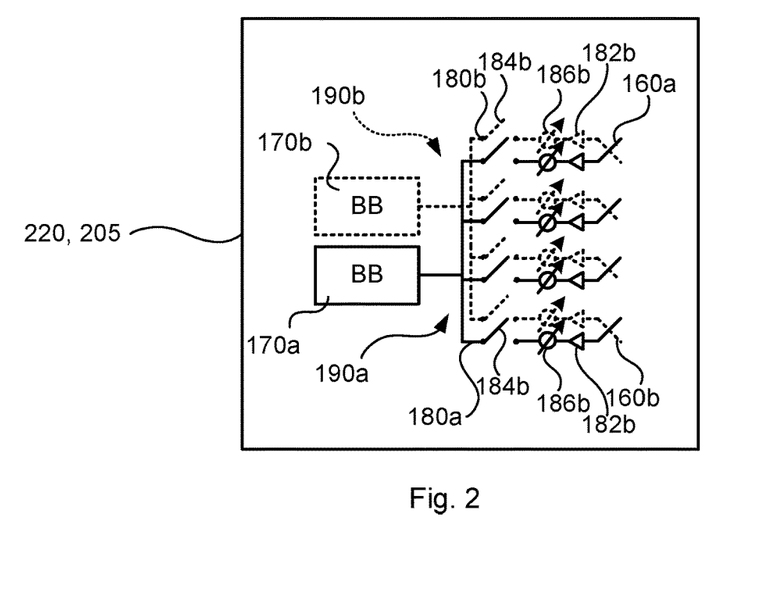
FIG. 2 schematically illustrates antenna arrays as comprised in a TRP or a communications interface of a radio transceiver device according to an embodiment.

FIG. 2 illustrates two antenna arrays 190a, 190b as comprised in a TRP 205 or a communications interface 220 of the radio transceiver device 200. In the illustrative example of FIG. 2 there are two antenna arrays 190a, 190b, each having M single polarized antenna elements 160a, 160b operatively connected to its own analog distribution network 180a, 180b (configured for analog beamforming) with one phase shifter 186a, 186b, and/or gain control element 182a, 182b, such as a power amplifier (PA) or a low-noise amplifier (LNA) and, optionally, a switch 184a, 184b per antenna element. Alternative configurations of the PAs/LNAs will be disclosed in relation to FIG. 3. In turn, each analog distribution network 180a, 180b is operatively connected to its own single baseband (BB) chain 170a, 170b. The single polarized antenna elements 160a, 160b have mutually orthogonal polarizations. The herein disclosed embodiments are not limited in terms of number of antenna arrays 190a, 190b. In general terms, the radio transceiver device 200 or the TRP 205 of the radio transceiver device 200 comprises at least one antenna array 190a, 190b.

Figure 3:
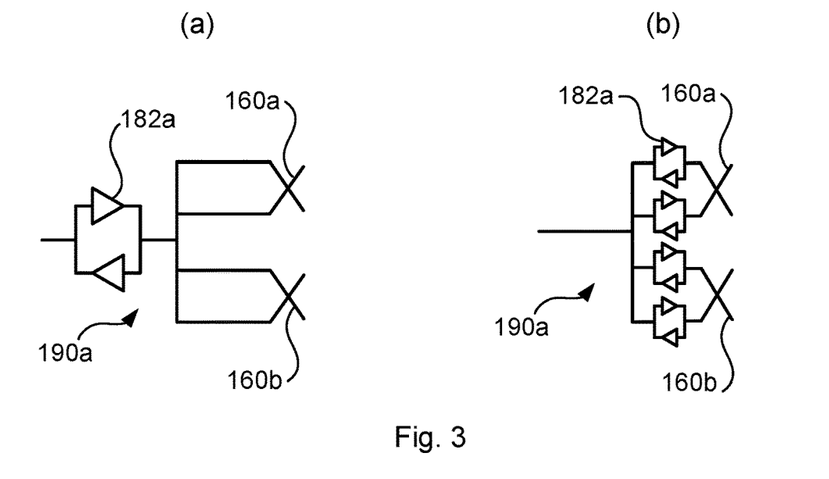
FIG. 3 schematically illustrates an antenna array according to an embodiment.

FIG. 3 schematically illustrates two implementation examples of PAs and LNAs representing gain control element 182a, 182b in an antenna array 190a, 190b. FIG. 3(*a*) illustrates a common configuration (i.e. with one common PA/LNA 182a, 182b for all the antenna elements). FIG. 3(*b*) illustrates a distributed PA/LNA configuration (i.e. with individual PAs/LNAs 182a, 182b per antenna element).

The radio transceiver devices 200, 300 are assumed to be configured to use beam forming when communicating with each other. Hence, beam management may be needed in order for the radio transceiver devices 200, 300 to determine which beams to use by the radio transceiver devices 200, 300 for communicating with each other. As disclosed above, when there are many candidate beams at both the radio transceiver device 200 and the radio transceiver device 300, using a beam sweeping procedure could be costly in terms of time consumption and overhead signalling.

The embodiments disclosed herein therefore relate to mechanisms for estimating angle of arrival α of a radio signal in a radio communications network 100. In order to obtain such mechanisms there is provided a radio transceiver device 200, a method performed by the radio transceiver device 200, a computer program product comprising code, for example in the form of a computer program, that when run on a radio transceiver device 200, causes the radio transceiver device 200 to perform the method.

Figure 4:
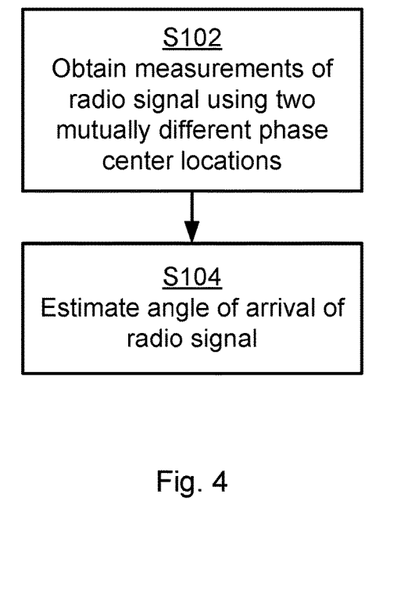
FIGS. 4, 8, and 9 are flowcharts of methods according to embodiments.
Figure 8:
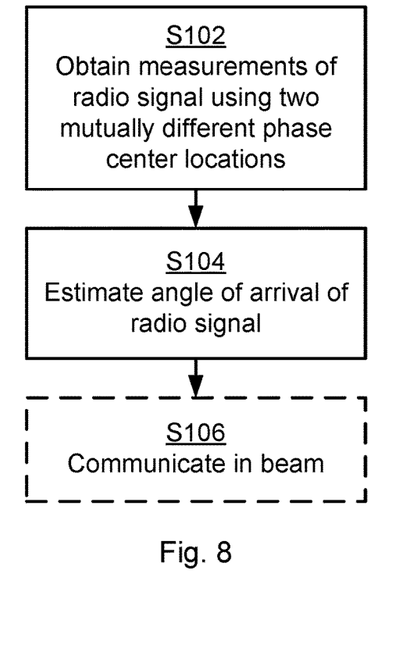

FIGS. 4 and 8 are flowcharts illustrating embodiments of methods for estimating angle of arrival α of a radio signal in a radio communications network 100. The methods are performed by the radio transceiver device 200. The methods are advantageously provided as computer programs 1220.

Reference is now made to FIG. 4 illustrating a method for estimating angle of arrival α of a radio signal in a radio communications network 100 as performed by the radio transceiver device 200 according to an embodiment.

The radio transceiver device 200 comprises an antenna array 190a, 190b (as in FIG. 2) that, by means of analog beamforming, is configured to shift between at least two phase center locations p1, p2. At least one of the two phase center locations p1, p2 is offset an initial center location p0 of the antenna array 190a, 190b.

It is assumed that the radio transceiver device 200 signals to the radio transceiver device 300 to transmit some kind of radio signal, such as reference signals, for examples uplink sounding reference signal (SRS) or downlink channel state information reference signals (CSI-RS), depending on whether the radio transceiver device 200 implements the functionality of a network node or a wireless device, such that the radio transceiver device 200 could determine the angle of arrival (AOA), denoted α, of the radio signal. It is further assumed that the radio transceiver device 300 transmits radio signals that could comprise such reference signals. Hence, the radio transceiver device 200 is configured to perform step S102:

S102: The radio transceiver device 200 obtains measurements of the radio signal as received by the antenna array 190a, 190b using two mutually different phase center locations p1, p2. These two mutually different phase center locations p1, p2 are thus two of the above-mentioned at least two phase center locations that the antenna array 190a, 190b is configured to shift between.

The measurements of the radio signal are then used for estimating the angle of arrival α of the radio signal. Hence, the radio transceiver device 200 is configured to perform step S104:

S104: The radio transceiver device 200 estimates the angle of arrival α of the radio signal using the measurements as obtained using the two mutually different phase center locations p1, p2.

In some aspects the angle of arrival α is represented by the electrical phase φ (such as according to the above disclosed relation). Hence, that the radio transceiver device 200 estimates the angle of arrival α of the radio signal using the measurements as obtained using the two mutually different phase center locations p1, p2 could be interpreted as the radio transceiver device 200 estimating, for the radio signal and using the measurement, the electrical phase shift caused by the radio signal being received by the antenna array 190a, 190b using the two mutually different phase center locations p1, p2.

The electrical phase shift is similar to electrical phase as defined above but represents the change of phase center location between p1 and p2 (i.e. not between p0 and p1 or between p0 and p2). The electrical phase shift thus has the relation $\varphi_s = 2\cdot\pi/d_{r,p1-p2}\cdot\sin(\alpha)$, where $\varphi_s$ is the electrical phase shift, where $d_{r,p1-p2}$ is the distance between p1 and p2, and where α is the angle of arrival. It could be that p1 and p2 each are separated from p0 by $d_r$ in opposite direction such that $d_{r,p1-p2} = 2d_r$.

Embodiments relating to further details of estimating angle of arrival α of a radio signal in a radio communications network 100 as performed by the radio transceiver device 200 will now be disclosed.

In some aspects the radio signal of which the measurements are obtained comprises reference signals, such as uplink SRS or downlink CSI-RS, and the measurements are made on the reference signals.

As noted above, in some aspects the angle of arrival α is estimated using a phase difference between measurements for the different phase centers p1, p2. This phase difference is equal to the electrical phase shift $\varphi_s$. Particularly, according to an embodiment the angle of arrival α of the radio signal is estimated using a phase difference between the measurements as obtained using one of the two mutually different phase center locations (say, p1) and the measurements as obtained using the other one of the two mutually different phase center locations (say, p2). Standard angle of arrival techniques such as MUltiple SIgnal Classification (MUSIC; an algorithm used for frequency estimation and emitter location), Estimation of Signal Parameters via Rotational Invariance Techniques (ESPRIT), conventional beamforming, spatial spectra, etc. can be used for this purpose.

In some aspects the different phase centers are achieved by alternatingly using partly overlapping sets of antenna elements when receiving the radio signals. In more detail, as disclosed above, the antenna array 190a, 190b comprises antenna elements 160a, 160b. A first set of the antenna elements could then be used when the radio signal is received by the antenna array 190a, 190b using one (say, p1) of the two mutually different phase center locations p1, p2. A second set of the antenna elements could then be used when the radio signal is received by the antenna array 190a, 190 using the other (say, p2) of the two mutually different phase center locations p1, p2. The second set is partly, but not fully, overlapping with the first set. For example, the first set and the second set could have all but two, or even one, antenna elements in common, but not all antenna elements in common.

There could be different ways to shift between the at least two phase center locations p1, p2. In some aspects particular antenna elements are actually switched off during reception of the radio signals using the antenna array 190a, 190b. Particularly, according to an embodiment the antenna array 190a, 190b comprises antenna elements 160a, 160b, and the antenna array 190a, 190b is configured to shift between the at least two phase center locations p1, p2 by selectively switching on and off at least one of the antenna elements 160a, 160b. By turning off different antenna elements at different times, the receive beam will have different phase centers at different times.

There could be different ways to actually switch off the particular antenna elements during reception of the radio signals. In some aspects the particular antenna elements are turned off by either turning off the LNAs 182a, 182b for the particular antenna elements (only applicable for distributed LNA configurations, such as in FIG. 3(b)), by using attenuators or by using switches (applicable for both common LNA configurations, such as in FIG. 3(a), and distributed LNA configurations, such as in FIG. 3(b)). Hence, according to an embodiment at least one of the antenna elements 160a, 160b is configured to be selectively switched on and off by selectively switching on and off an LNA 182a, 182b, an attenuator, or a switch 184a, 184b of this at least one of the antenna elements 160a, 160b.

In other aspects the antenna elements are not completely switched off, but instead the LNAs 182a, 182b are used to reduce the received power for the particular antenna elements (only applicable for distributed LNA configurations, such as in FIG. 3(b)). Hence, according to an embodiment the antenna array 190a, 190b comprises antenna elements 160a, 160b, and the antenna array 190a, 190b is configured to shift between the at least two phase center locations p1, p2 by selectively increasing and reducing gain of an LNA 182a, 182b of at least one of the antenna elements 160a, 160b. This allows for a flexible placement of the phase center of the antenna array 190a, 190b, which means that it is possible to have a difference between the phase center locations of 0.5 wavelengths between receive beams of the antenna array 190a, 190b even if the antenna element separation in the antenna array 190a, 190b is larger than 0.5 wavelengths.

Dual-polarized beamforming can be used for the active antenna elements of the antenna array 190a, 190b in order to minimize the loss in received signal strength due to turning off, or reducing gain of, some of the antenna elements 160a, 160b. Particularly, according to an embodiment the antenna array 190a, 190b comprises antenna elements 160a, 160b, and the radio signal for each one of the two mutually different phase center locations p1, p2 is received in at least one receive beam being created by the analog beamforming in the antenna array 190a, 190b only using phase shifts (as implemented by the phase shifters 186a, 186b) of those of the antenna elements 160a, 160b that are used to create the at least one receive beam.

A way to create wide beams as well as narrow beams with phase shifts only applied at the antenna array 190a, 190b is by means of the array expansion technique described in WO2016141961 A1. WO2016141961 A1 relates to beam forming using an antenna array comprising dual polarized antenna elements. One or two beam ports are generated, wherein the one or two beam ports are defined by combining at least two non-overlapping subarrays of antenna elements. Each subarray has two subarray ports, the two subarray ports having identical power patterns and mutually orthogonal polarization. The at least two non-overlapping subarrays are combined via expansion weights. The expansion weights map the one or two beam ports to subarray ports such that the one or two beam ports have the same power pattern as the subarrays. At least some of the expansion weights have identical non-zero magnitude and are related in phase to form a transmission lobe.

Further, by applying principles disclosed in document WO2011/050866A1 it is, for example, possible to generate as wide array beam widths as the element beam width regardless of how many antenna elements there are in the antenna array, thus resulting in dual-polarization beamforming. Dual-polarization beamforming can thus be used to selectively widening or narrowing beams as needed. Hence, principles disclosed in document WO2011/050866A1 can be applied to the analog beamforming network in order to create the beams.

Other examples of principles that could be used to generate wide beams as well as narrow beams as needed are based on optimizing complex weights of the antenna array 190a, 190b or by muting some antenna elements of the antenna array 190a, 190b. Particularly, according to an embodiment the antenna array 190a, 190b comprises antenna elements 160a, 160b, and the radio signal for each one of the two mutually different phase center locations p1, p2 is received in at least one receive beam being created by the analog beamforming in the antenna array 190a, 190b using a combination of phase shifts (as implemented by the phase shifters 186a, 186b) and amplitude tapering (as implemented by the LNAs 182a, 182b) of those of the antenna elements 160a, 160b that are used to create the at least one receive beam.

In some aspects the antenna arrays 190a 190b collectively comprise antenna elements of two polarizations. Both polarizations of the antenna elements 160a, 160b could then be turned off at the same time. Thus, according to an embodiment the antenna elements 160a, 160b have two mutually orthogonal polarizations, and both orthogonal polarizations are simultaneously switched on and off as the at least one of the antenna elements 160a, 160b is selectively switched on and off.

Further, for at least some radio propagation channels the angle of arrival is typically the same regardless of the polarization and thus two angle of arrival estimates, one for each polarization, could be combined to a single estimate. That is, according to an embodiment one intermediate value of the angle of arrival α is estimated for each of the two mutually orthogonal polarizations. The angle of arrival α is then estimated using a combination of the intermediate values.

Further, according to an embodiment the antenna array 190a, 190b is configured to simultaneously receive the radio signals in the two mutually orthogonal polarizations. One reason for this is that the polarization of the incoming wave of the radio signal is typically unknown. In order to attain reliable measurements the reception of the radio signal could therefore be performed for both polarization simultaneously. However, whether the radio signal is received in a particular element or not depends inter alia on how the radio signal is polarized.

Figure 5:
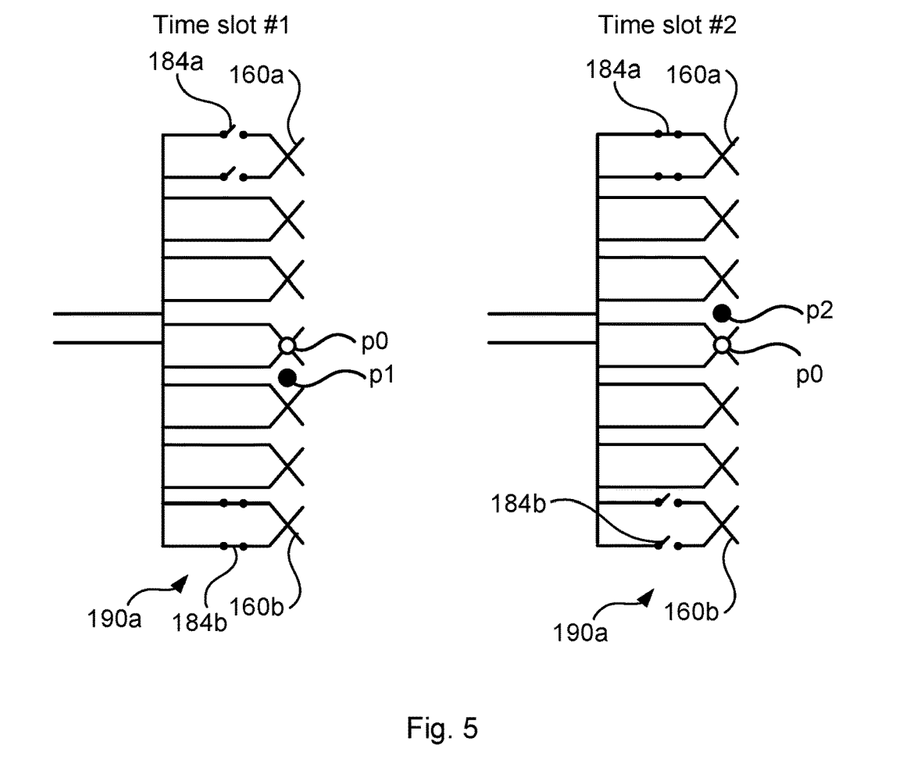
FIG. 5 schematically illustrates an antenna array operating in two time slots according to an embodiment.

According to an embodiment the radio signal is received by the antenna array 190a, 190b using a first (say, p1) of the two mutually different phase center locations p1, p2 in a first time slot and a second (say, p2) of the two mutually different phase center locations p1, p2 in a second time slot. FIG. 5 schematically illustrates a one-dimensional antenna array 190a where switches are used to selectively turn off some of the antenna elements 160a, 160b. The antenna array 190a is illustrated as operating in two time slots. In a first time slot ("Time slot #1"), the top antenna element is turned off and the receive beam is generated by applying dual-polarized beamforming over the remaining active antenna elements. By turning off the top element the phase center of the antenna array 190a will be moved downwards from the default location p0 by 0.25 wavelengths to the phase center location p1 (given that all antenna elements are used with the same amplitude, i.e. for no tapering antenna arrays and assuming that the antenna elements 160a, 160b are separated by 0.5 wavelength). In the second time slot (Time slot #2), the bottom antenna element is turned off. This will move the phase center of the antenna array 190a upwards by 0.25 wavelengths relative p0 to the phase center location p2. By performing measurements on received radio signals for the two time slots, angle of arrival estimations can be attained without unambiguity due to a total phase center separation of 0.5 wavelengths between the two receive beams at the respective time slots.

With the assumed analog beamforming architecture of the antenna array 190a, 190b, sequential measurements are preferred for the radio signal in order to attain measurements for both the orthogonal polarizations (as described above). One straightforward way to achieve this is for the radio transceiver device 300 to transmit the radio signal in two consecutive orthogonal frequency-division multiplexing (OFDM) symbols, and hence for the radio transceiver device 200 to measure the radio signal in these two consecutive OFDM symbols. It is also possible to perform the two measurements in a single OFDM symbol by first measuring the radio signal using a first phase center location p1 in the first half of an OFDM symbol and then measuring the radio signal in the second half of the same OFDM symbol using a second phase center location p2. Thus, according to an embodiment each measurement of the radio signal corresponds to either one whole or a fraction of an OFDM symbol such that one whole or one fraction of the OFDM symbol on which a respective one of the measurements is based is received using each one of the two mutually different phase center locations p1, p2. The fraction (of the OFDM symbol) could correspond to the repetition factor of so-called interleaved orthogonal frequency division multiplexing (IOFDM).

Figure 6:
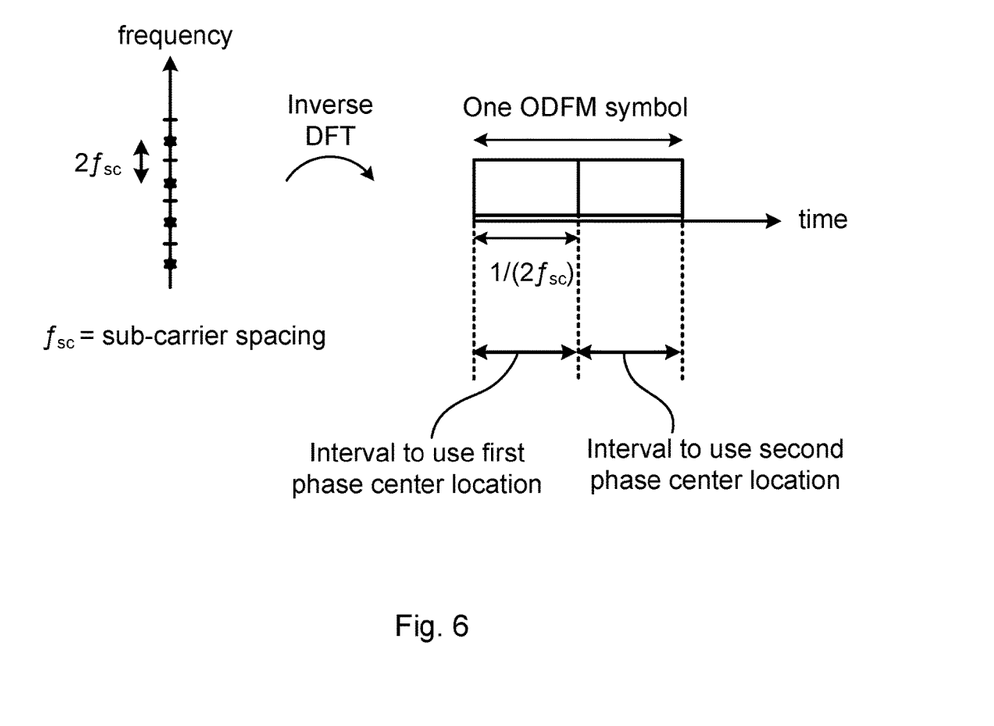
FIG. 6 schematically illustrates generation of half OFDM symbols according to an embodiment.

One way to achieve this is for the transmitting radio transceiver device 300 to transmit a beam reference signal (defining the radio signal) that occupies only every k:th sub-carrier, where k represents the repetition factor. As an example, transmitting on every second sub-carrier means a zero insertion between every other sample in the frequency domain. By properties of the discrete Fourier transform (DFT), this implies a two-fold periodic repetition of the time domain signal, as illustrated in FIG. 6. FIG. 6 schematically illustrates how to generate half OFDM symbols by transmitting on every second sub-carrier. Hence, transmitting on every second sub-carrier means that the resulting OFDM symbol will consist of two identical halves and measurements in the first receive beam can then be performed in the first half and in the second receive beam in the second half (or vice versa).

Transmitting reference signals on every second subcarrier is common practice in Long Term Evolution (LTE) based communications networks where the uplink SRS is transmitted using a so-called comb pattern, where every second or every fourth sub-carrier is occupied by a reference symbol. Therefore, performing the proposed angle of arrival estimation in a single OFDM symbol could be used with SRS-like reference signal structures. Advantages with performing measurements on both phase center locations p1, p2 in a single OFDM symbol are reduced reference signal overhead and reduced channel variation between the two successive measurements.

Figure 7:
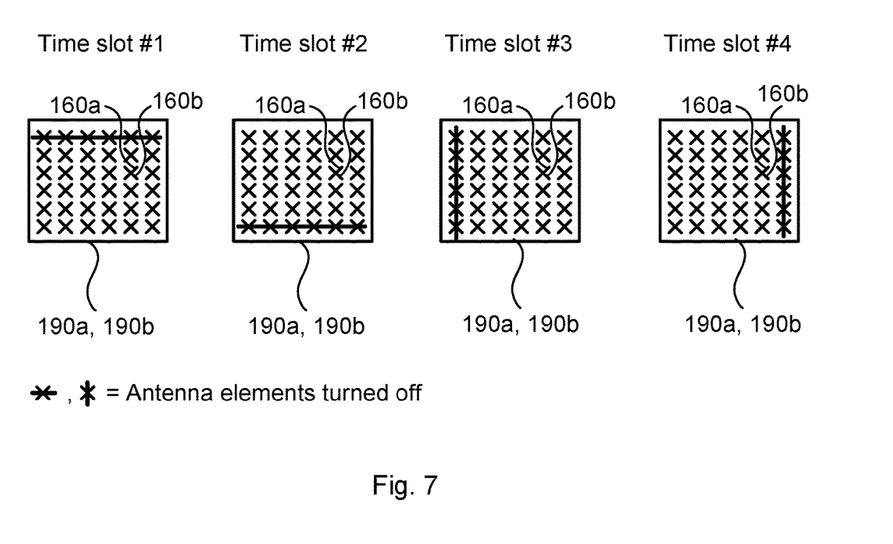
FIG. 7 schematically illustrates an antenna array operating in four time slots according to an embodiment

In one embodiment with two two-dimensional antenna arrays 190a, 190b, the antenna elements 160a, 160b in one of the two dimensions can be used to attain an estimation of angle of arrival in that dimension (e.g. in azimuth) and the antenna elements 160a, 160b in the other of the two dimensions can be used to attain an estimation of angle of arrival in that dimension (e.g. in elevation) simultaneously, in order to speed up the estimation of angle of arrival. That is, in an embodiment where the antenna array 190a, 190b is a two-dimensional antenna array, and the angle of arrival α could be simultaneously estimated in both dimensions (such as in both azimuth domain and elevation domain). That is, the angle of arrival α could have two components; one in each of the two dimensions. The herein disclosed embodiments are thus applicable to two-dimensional antenna arrays which can then be used to estimate direction of arrival in both the azimuth and elevation domains. This could require four measurements of the radio signal to form a discriminator in both azimuth and elevation. This could be performed in a single OFDM symbol by transmitting a reference signal on every fourth subcarrier. FIG. 7 illustrates one example where an estimation of angle of arrival α is attained in both the azimuth domain and the elevation domain for a two-dimensional antenna array 190a. The antenna array 190a is illustrated as operating in four time slots. In the first two time slots (Time slot #1 and Time slot #2) an estimation of the angle of arrival α in the elevation domain is attained and in the two last time slots (Time slot #3 and Time slot #4) an estimation of the angle of arrival α in the azimuth domain is attained. The direction of arrival in both the azimuth and elevation domains could even require only three measurements of the radio signal to form a discriminator in both azimuth and elevation with one phase center that is common for the two dimensions and one additional phase center per dimension. In relation to FIG. 7 this could be achieved inter alia by simultaneously switching of the antenna elements of the top row and the left column (i.e. combining the configuration of the antenna array as used in timeslots #1 and #3).

By properly selecting which antenna elements 160a, 160b to turn off a phase center separation of around 0.5 wavelengths of the operating frequency of the received radio signal can be attained (as long as the antenna element separation within the antenna array 190a, 190b is around 0.5 wavelengths, which typically is the case) between the receive beams (for a given dimension), which will enable unambiguous angle of arrival estimations (for that given dimension). In further detail, a separation of half a wavelength enables unambiguous estimation, but if an estimate within a smaller interval than [−π/2, π/2] is sufficient then the separation could be larger than half the wavelength. For example, in the elevation domain the antenna elements 160a, 160b might be separated by around 0.7-0.8 wavelengths since the angular interval of interest often is smaller in the elevation domain than in the azimuth domain. If a row (either the top row or the bottom row) of antenna elements is turned off, such as in FIG. 7, the phase center location will be moved by the separation of antenna elements in the antenna array. In most practical cases this distance is smaller than the wavelength. In particular, according to an embodiment the two mutually different phase center locations p1, p2 are separated at least by half a wavelength of the operating frequency of the received radio signal. According to a further embodiment adjacent antenna elements 160a, 160b of the antenna array 190a, 190b are separated at least by half a wavelength of the operating frequency of the received radio signal.

In some aspects it could be required that the antenna array 190a, 190b is calibrated to some level of accuracy. This could be required in order to facilitate analog beamforming. Calibration across different antenna arrays 190a, 190b is not required.

Reference is now made to FIG. 8 illustrating methods for estimating angle of arrival α of a radio signal in a radio communications network 100 as performed by the radio transceiver device 200 according to further embodiments. It is assumed that steps S102, S104 are performed as described above with reference to FIG. 4 and a thus repeated description thereof is therefore omitted.

As disclosed above, in some aspects the radio signal is a beam reference signal received from another radio transceiver device 300. The radio transceiver device 200 could therefore be configured to use the estimated angle of arrival α to determine which analog beam(s) to use in subsequent data communication with the so-called another transceiver device 300. Particularly, according to an embodiment where the radio signal is received from another radio transceiver device 300 the radio transceiver device 200 is configured to perform step S106:

S106: The radio transceiver device 200 communicates with the so-called radio transceiver device 300 in a beam, where the beam points in a direction selected according to the angle of arrival α. The beam could be a receive beam and/or a transmit beam.

That is assuming that the radio transceiver device 200 is configured to communicate in multiple, narrow, beams, the radio transceiver device 200 could, based on the estimated angle of arrival α, select the beam that is closest to the estimated angle of arrival α for use in subsequent data communication with the so-called another radio transceiver device 300.

Figure 9:
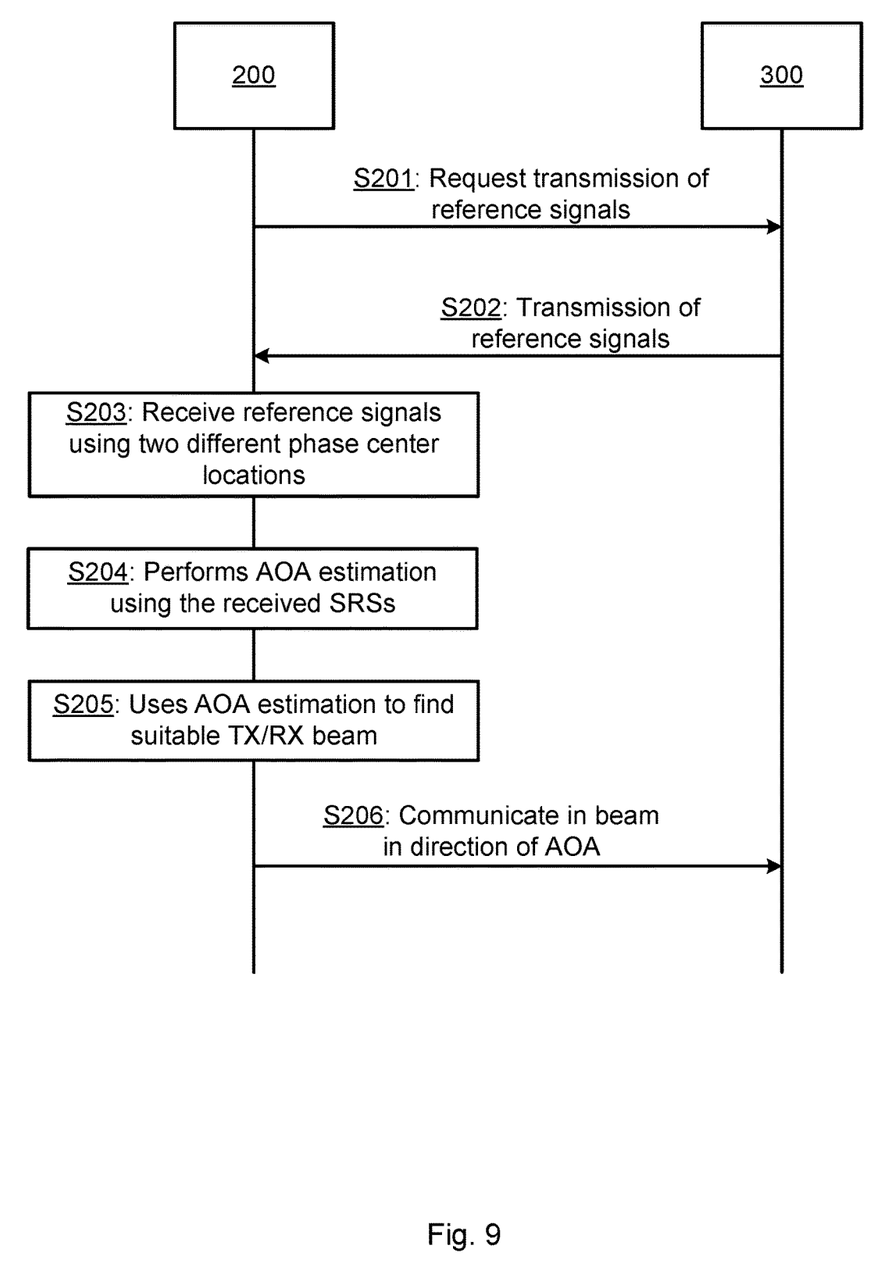

One particular embodiment for estimating the angle of arrival α of a radio signal in a radio communications network 100 as performed by the radio transceiver device 200 based on at least some of the above disclosed embodiments will be disclosed next with reference to the signalling diagram of FIG. 9.

S201: The radio transceiver device 200 signals to the radio transceiver device 300 to transmit reference signals, such as SRS or CSI-RS.

S202: The radio transceiver device 300 transmits the reference signals. The reference signals should be transmitted in orthogonal time slots such that the radio transceiver device 200 can use different phase center locations p1, p2 for the different reference signals.

S203: During reception of each reference signal, one or multiple antenna elements are turned off in order to use a suitable phase center location for the receive beam of the antenna array. The remaining active antenna elements are used to form a receive beam with desired shape using dual polarized beamforming. One way to implement step S203 is to perform step S102.

S204: The radio transceiver device 200 estimates the angle of arrival of the received reference signals by using standard angle of arrival estimation techniques. One way to implement step S204 is to perform step S104.

S205: The radio transceiver device 200 uses the estimated angle of arrival α as input for beam management in order to find suitable a transmission and/or reception beam. One way to implement step S205 is to perform step S106.

S206: The radio transceiver device 200 communicates with the radio transceiver device 300 in transmission and/or reception beam, where the transmission and/or reception beam points in a direction selected according to the angle of arrival α. One way to implement step S206 is to perform step S106.

Figure 10:
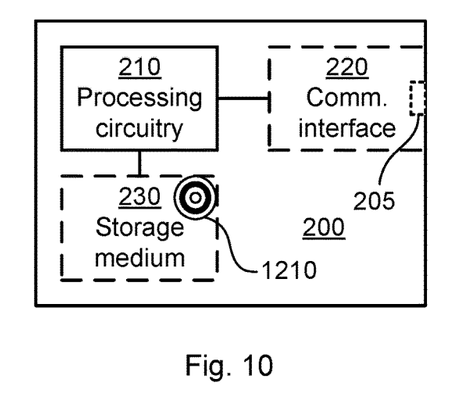
FIG. 10 is a schematic diagram showing functional units of a radio transceiver device according to an embodiment.

FIG. 10 schematically illustrates, in terms of a number of functional units, the components of a radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210 (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200 to perform a set of operations, or steps, S102-S106, as disclosed above. For example, the storage medium 230 may store the set of operations, and the processing circuitry 210 may be configured to retrieve the set of operations from the storage medium 230 to cause the radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200 may further comprise a communications interface 220 at least configured for communications with other entities, nodes, functions, and devices of the communications network 100, such as at least one other radio transceiver device 300. As such the communications interface 220 may comprise one or more transmitters and receivers, comprising analogue and digital components. Particularly, the radio transceiver device 200 comprises at least one analog antenna array 190a, 190b that might be part of the communications interface 220. The processing circuitry 210 controls the general operation of the radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200 are omitted in order not to obscure the concepts presented herein.

Figure 11:
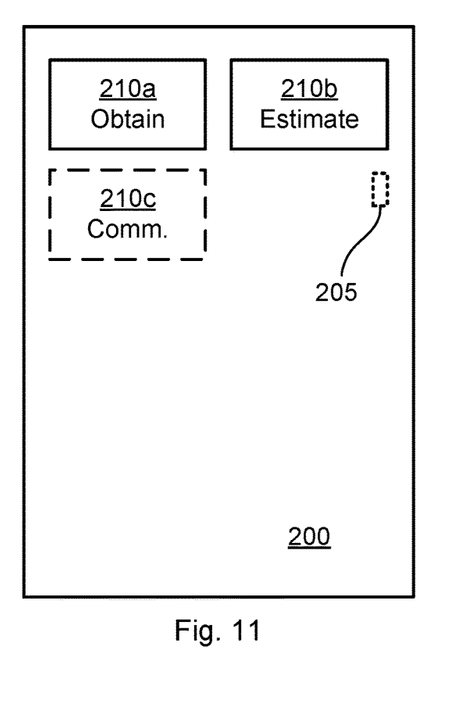
FIG. 11 is a schematic diagram showing functional modules of a radio transceiver device according to an embodiment.

FIG. 11 schematically illustrates, in terms of a number of functional modules, the components of a radio transceiver device 200 according to an embodiment. The radio transceiver device 200 of FIG. 11 could comprises at least one analog antenna array 190a, 190b in addition to a number of functional modules; an obtain module 210a configured to perform step S102, and an estimate module 210b configured to perform step S104. The radio transceiver device 200 of FIG. 11 may further comprise a number of optional functional modules, such as a communications module 210c configured to perform step S106. In general terms, each functional module 210a-210c may in one embodiment be implemented only in hardware and in another embodiment with the help of software, i.e., the latter embodiment having computer program instructions stored on the storage medium 230 which when run on the processing circuitry 210 makes the radio transceiver device 200 perform the corresponding steps mentioned above in conjunction with FIG. 11. It should also be mentioned that even though the modules correspond to parts of a computer program, they do not need to be separate modules therein, but the way in which they are implemented in software is dependent on the programming language used. Preferably, one or more or all functional modules 210a-210c may be implemented by the processing circuitry 210, possibly in cooperation with the communications interface 220 and/or the storage medium 230. The processing circuitry 210 may thus be configured to from the storage medium 230 fetch instructions as provided by a functional module 210a-210c and to execute these instructions, thereby performing any steps as disclosed herein.

The radio transceiver device 200 may be provided as a standalone device or as a part of at least one further device. As disclosed above, the radio transceiver device 200 could be a radio access network node. For example, the radio transceiver device 200 may be provided in a node of the radio access network 110 or in a node of the core network 120. Alternatively, functionality of the radio transceiver device 200 may be distributed between at least two devices, or nodes. These at least two nodes, or devices, may either be part of the same network part (such as the radio access network 110 or the core network 120) or may be spread between at least two such network parts.

Thus, a first portion of the instructions performed by the radio transceiver device 200 may be executed in a first device, and a second portion of the of the instructions performed by the radio transceiver device 200 may be executed in a second device; the herein disclosed embodiments are not limited to any particular number of devices on which the instructions performed by the radio transceiver device 200 may be executed. Hence, the methods according to the herein disclosed embodiments are suitable to be performed by a radio transceiver device 200 residing in a cloud computational environment. Therefore, although a single processing circuitry 210 is illustrated in FIG. 10 the processing circuitry 210 may be distributed among a plurality of devices, or nodes. The same applies to the functional modules 210a-210c of FIG. 11 and the computer program 1220 of FIG. 12 (see below).

Figure 12:
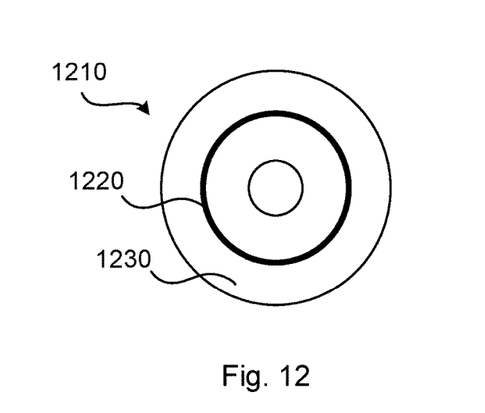
FIG. 12 shows one example of a computer program product comprising computer readable storage medium according to an embodiment.

FIG. 12 shows one example of a computer program product 1210 comprising computer readable storage medium 1230. On this computer readable storage medium 1230, a computer program 1220 can be stored, which computer program 1220 can cause the processing circuitry 210 and thereto operatively coupled entities and devices, such as the communications interface 220 and the storage medium 230, to execute methods according to embodiments described herein. The computer program 1220 and/or computer program product 1210 may thus provide means for performing any steps as herein disclosed.

In the example of FIG. 12, the computer program product 1210 is illustrated as an optical disc, such as a CD (compact disc) or a DVD (digital versatile disc) or a Blu-Ray disc. The computer program product 1210 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220 is here schematically shown as a track on the depicted optical disk, the computer program 1220 can be stored in any way which is suitable for the computer program product 1210.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for estimating angle of arrival of a radio signal in a radio communications network, the method being performed by a radio transceiver device comprising an antenna array that is configured to shift between at least two phase center locations, the method comprising:
    obtaining measurements of the radio signal as received by the antenna array using two mutually different phase center locations of the antenna array, wherein obtaining the measurements comprises:
    configuring the antenna array to have a first phase center location (p1),
    while the antenna array has the first phase center location, using the antenna array to obtain a first measurement of the radio signal,
    configuring the antenna array to have a second phase center location (p2) that is different than the first phase center location (p1), and
    while the antenna array has the second phase center location, using the antenna array to obtain a second measurement of the radio signal; and
    estimating the angle of arrival of the radio signal using the first and second measurements as obtained using the first and second phase center locations of the antenna array.

2. The method of claim 1, wherein the angle of arrival of the radio signal is estimated using a phase difference between the first measurement as obtained using the first phase center location (p1) and the second measurement as obtained using the second phase center location (p2).

3. The method of claim 1, wherein the two mutually different phase center locations are separated at least by half a wavelength of an operating frequency of the received radio signal.

4. The method of claim 1, wherein the antenna array comprises antenna elements, and wherein adjacent antenna elements are separated at least by half a wavelength of an operating frequency of the received radio signal.

5. The method of claim 1, wherein the antenna array comprises antenna elements, wherein a first set of the antenna elements is used when the radio signal is received by the antenna array using one of the two mutually different phase center locations, wherein a second set of the antenna elements is used when the radio signal is received by the antenna array using the other of the two mutually different phase center locations, and wherein the second set is partly but not fully overlapping with the first set.

6. The method of claim 1, wherein the antenna array comprises antenna elements, and wherein the antenna array is configured to shift between the at least two phase center locations by selectively switching on and off at least one of the antenna elements.

7. The method of claim 6, wherein at least one of the antenna elements is configured to be selectively switched on and off by selectively switching on and off a low-noise amplifier, an attenuator, or a switch of said at least one of the antenna elements.

8. The method of claim 6, wherein the antenna elements have two mutually orthogonal polarizations, and wherein both orthogonal polarizations are simultaneously switched on and off as the at least one of the antenna elements is selectively switched on and off.

9. The method of claim 1, wherein the antenna array comprises antenna elements, and wherein the antenna array is configured to shift between the at least two phase center locations by selectively increasing and reducing gain of a low-noise amplifier of at least one of the antenna elements.

10. The method of claim 1, wherein the antenna array is configured to simultaneously receive the radio signals in two mutually orthogonal polarizations.

11. The method of claim 10, wherein one intermediate value of the angle of arrival is estimated for each of the two mutually orthogonal polarizations, and wherein the angle of arrival is estimated using a combination of the intermediate values.

12. The method of claim 1, wherein the antenna array comprises antenna elements, and wherein the radio signal for each one of the two mutually different phase center locations is received in at least one receive beam being created by the analog beamforming in the antenna array only using phase shifts of those of the antenna elements that are used to create the at least one receive beam.

13. The method according of claim 1, wherein the antenna array comprises antenna elements, and wherein the radio signal for each one of the two mutually different phase center locations is received in at least one receive beam being created by the analog beamforming in the antenna array using a combination of phase shifts and amplitude tapering of those of the antenna elements that are used to create the at least one receive beam.

14. The method of claim 1, wherein the radio signal is received by the antenna array using a first of the two mutually different phase center locations in a first time slot and a second of the two mutually different phase center locations in a second time slot.

15. The method of claim 1, wherein each measurement of the radio signal corresponds to either one whole or a fraction of an orthogonal frequency-division multiplexing, OFDM, symbol such that one whole or one fraction of the OFDM symbol on which a respective one of the measurements is based is received using each one of the two mutually different phase center locations.

16. The method of claim 1 wherein the antenna array is a two-dimensional antenna array, and wherein the angle of arrival is simultaneously estimated in both dimensions.

17. The method of claim 1, wherein the radio signal is received from another radio transceiver device, the method further comprising:
    communicating with said another radio transceiver device in a beam, the beam pointing in a direction selected according to the angle of arrival.

18. A radio transceiver device for estimating angle of arrival of a radio signal in a radio communications network, the radio transceiver device comprising an antenna array that is configured to shift between at least two phase center locations, the radio transceiver device further comprising processing circuitry, the processing circuitry being configured to cause the radio transceiver device to:
    obtain measurements of the radio signal as received by the antenna array using two mutually different phase center locations of the antenna array,
    wherein the radio transceiver device is configured to obtain the measurements by performing a process that includes:
    configuring the antenna array to have a first phase center location (p1), while the antenna array has the first phase center location, using the antenna array to obtain a first measurement of the radio signal, configuring the antenna array to have a second phase center location (p2) that is different than the first phase center location (p1), and while the antenna array has the second phase center location, using the antenna array to obtain a second measurement of the radio signal; and estimate the angle of arrival of the radio signal using the first and second measurements as obtained using the first and second phase center locations of the antenna array.

19. The radio transceiver device of claim 18, wherein the radio transceiver device is a radio access network node.

20. A computer program product comprising a non-transitory computer readable medium storing a computer program for estimating angle of arrival of a radio signal in a radio communications network, the computer program comprising computer code which, when run on processing circuitry of a radio transceiver device comprising an antenna array that, by means of analog beamforming, is configured to shift between at least two phase center locations, causes the radio transceiver device to:

obtain measurements of the radio signal as received by the antenna array using two mutually different phase center locations of the antenna array, wherein the computer program configures the radio transceiver device to obtain the measurements by performing a process that includes:

configuring the antenna array to have a first phase center location (p1), while the antenna array has the first phase center location, using the antenna array to obtain a first measurement of the radio signal, configuring the antenna array to have a second phase center location (p2) that is different than the first phase center location (p1), and while the antenna array has the second phase center location, using the antenna array to obtain a second measurement of the radio signal; and estimate the angle of arrival of the radio signal using the first and second measurements as obtained using the first and second phase center locations of the antenna array.

* * * * *